United States Patent [19]
Motomura

[11] Patent Number: 5,477,469
[45] Date of Patent: Dec. 19, 1995

[54] OPERATION DEVICE AND OPERATION METHOD FOR DISCRETE COSINE TRANSFORM AND INVERSE DISCRETE COSINE TRANSFORM

[75] Inventor: Masato Motomura, Tokyo, Japan

[73] Assignee: NEC Corporation, Tokyo, Japan

[21] Appl. No.: 151,105

[22] Filed: Nov. 12, 1993

[30] Foreign Application Priority Data

Nov. 12, 1992 [JP] Japan .................................. 4-302071

[51] Int. Cl.$^6$ .................................................. G06F 17/00
[52] U.S. Cl. ...................... 364/514 R; 364/725; 382/250
[58] Field of Search ............................... 364/514 R, 725, 364/715.02; 382/56; 395/127, 129

[56] References Cited

U.S. PATENT DOCUMENTS

| | | | |
|---|---|---|---|
| 4,841,464 | 6/1989 | Guichard et al. | 364/725 |
| 4,849,922 | 7/1989 | Riolfo | 364/725 |
| 5,181,183 | 1/1993 | Miyazaki | 364/725 |
| 5,249,146 | 9/1993 | Uramoto et al. | 364/725 |
| 5,257,213 | 10/1993 | Kim et al. | 364/725 |
| 5,276,784 | 1/1994 | Ohki | 395/127 |
| 5,341,318 | 8/1994 | Balkanski et al. | 364/725 |
| 5,345,408 | 9/1994 | Hoogenboom | 364/725 |
| 5,353,060 | 10/1994 | Keesen et al. | 364/408 |
| 5,357,453 | 10/1994 | Kim et al. | 364/725 |
| 5,361,220 | 11/1994 | Asano | 364/725 |

OTHER PUBLICATIONS

Jain et al., "VLSI Implementation of Two-Dimensional DCT Processor in Real Time for Video Codec", Aug. 1992.
Jang et al., "A 0.8 m 100 mHz 2-D DCT Core Processor", Aug. 1994.
Chiu et al., "Real-Time Parallel and Fully Pipelined Two-Dimensional DCT Lattice Structures with Appl. to HDTV Systems", Mar. 1992.
Feig et al., "Fast Algorithms for the Discrete Cosine Transform", Sep. 1992.
Lee, "A New Algorithm to Compute the Discrete Cosine Transform", *IEEE Transaction Acoustics, Speech and Signal Processing*, vol. ASSP-32, No. 6, pp. 1243-1245 (Dec. 1984).

*Primary Examiner*—Ellis B. Ramirez
*Assistant Examiner*—Patrick J. Assouad
*Attorney, Agent, or Firm*—Foley & Lardner

[57] ABSTRACT

With addition/subtraction and product-sum operation procedures, a one-dimensional N-order discrete cosine transform (DCT) operation is performed so that N pieces of DCT results can be obtained from N pieces of original image data with arguments from 0 to (N-1). In the addition/subtraction procedure, among M pieces of data with arguments from 0 to (M-1) (M is a positive integer expressed as a positive power of 2 from 2 to N), two data for which the sum of the arguments is M-1 are subjected to addition/subtraction for ($\log_2 N$ - 1) times to obtain M/2 pieces of addition results and subtraction results with arguments from 1 to (M/2–1). In the product-sum operation procedure, L pieces of data with arguments from 0 to (L-1) (L is a positive integer expressed as a positive power of 2 from 2 to N/2) and $L^2$ pieces of DCT coefficients are subjected to product-sum operation for ($\log_2 N$ - 1) times to obtain and output L pieces of DCT results. Two data with arguments from 0 to 1 and four DCT coefficients are subjected to product-sum operation once to obtain and output two DCT results.

10 Claims, 7 Drawing Sheets

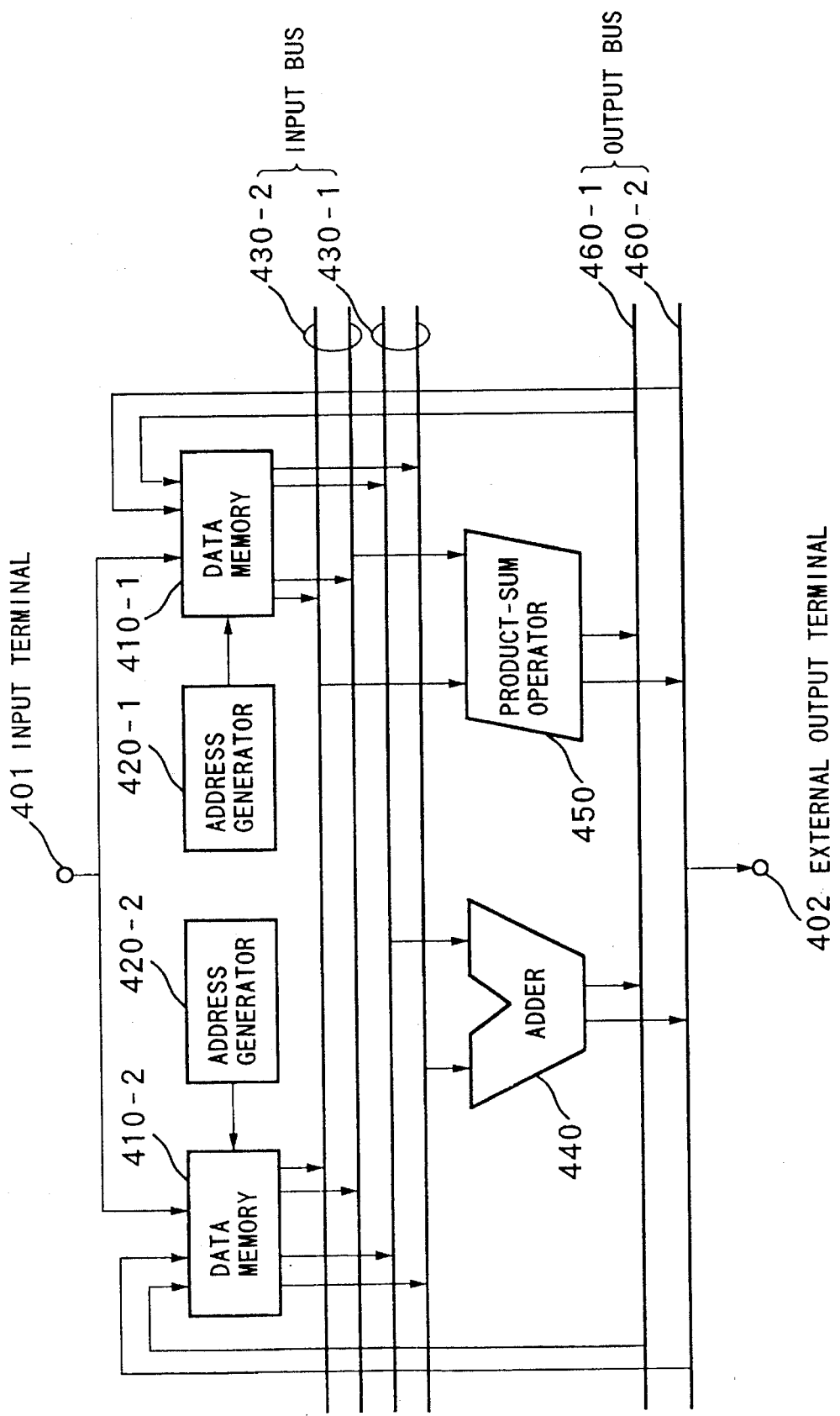

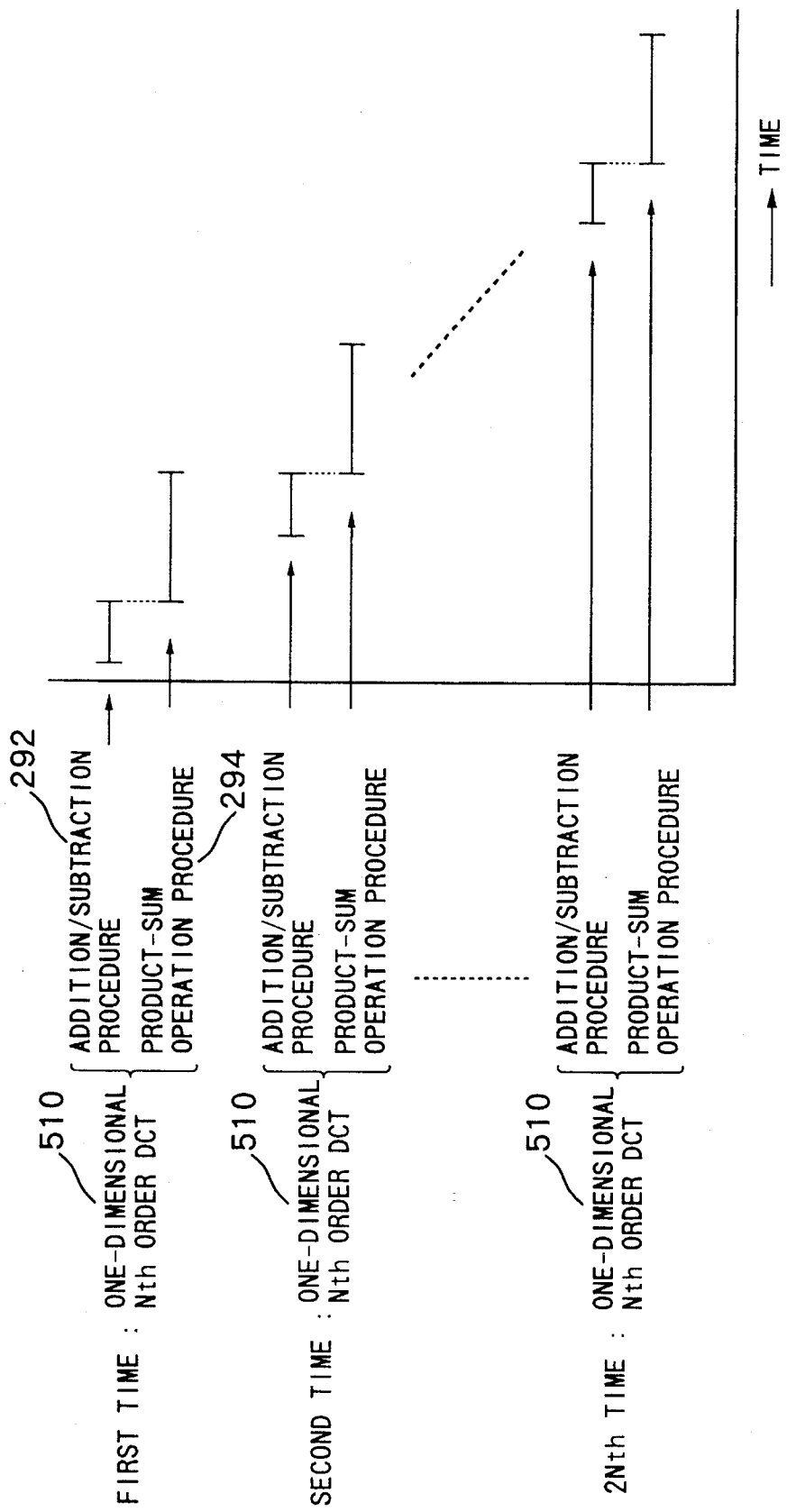

FIG. 6

| | FIRST CONVENTIONAL OPERATION METHOD | SECOND CONVENTIONAL OPERATION METHOD | OPERATION METHOD OF THE PRESENT INVENTION |
|---|---|---|---|
| OPERATION PROCEDURE FOR ONE-DIMENSIONAL EIGHTH ORDER DCT AND REVERSE DCT | PRODUCT-SUM OPERATION : 64 TIMES | ADDITION/SUBTRACTION : 5 TIMES ↕ MULTIPLICATION : 5 TIMES ↕ ADDITION/SUBTRACTION : 8 TIMES ↕ MULTIPLICATION : 4 TIMES ↕ ADDITION/SUBTRACTION : 8 TIMES ↕ MULTIPLICATION : 4 TIMES ↕ ADDITION/SUBTRACTION : 8 TIMES | PRODUCT-SUM OPERATION : 24 TIMES ↕ SUBTRACTION : 12 TIMES |
| OPERATION AMOUNT OF ONE-DIMENSIONAL Nth ORDER DCT AND REVERSE DCT | $N^2$ | $2N\log_2 N - N + 1$ | $\frac{1}{3}(N^2 + 6N - 4)$ |

OPERATION DEVICE AND OPERATION METHOD FOR DISCRETE COSINE TRANSFORM AND INVERSE DISCRETE COSINE TRANSFORM

BACKGROUNDS OF THE INVENTION

1. Field of the Invention

The present invention relates to an operation device and operation method for Discrete Cosine Transform (hereinafter referred to as DCT) and inverse Discrete Cosine Transform (hereinafter referred to as inverse DCT) used for high efficiency coding of image data in video phone system, TV conference system, and digital VTR.

2. Description of the Related Art

DCT is a method for transforming discrete data such as image information (hereinafter referred to as original image data) into discrete data in the frequency space (hereinafter referred to as DCT results) by using the cosine function. It is executed by product-sum operation of the original image data and DCT coefficients, and DCT results are obtained as the result of such operation. Inverse DCT is an inverse transform of the above DCT. It is executed by product-sum operation of the DCT results and inverse DCT coefficients, and the original image data can be obtained as a result of such inverse DCT. When the number of data is N, one-dimensional DCT and inverse DCT is referred to as N-order one-dimensional DCT or N-order one-dimensional inverse DCT, or one-dimensional N-order DCT and one-dimensional N-order inverse DCT.

Supposing the original image data in N order one-dimensional DCT and inverse DCT to be x (i; N) and the DCT results to be y (k; N), the relationship between y (k; N) and x (i; N) are expressed by the following formulae (1) and (2) respectively. Note that $0 \leq i < N$ and $0 \leq k < N$ here.

$$y(k; N) = x(i; N) d(i, k; N) \, \text{ii} \quad (1)$$

$$x(i; N) = f(i, k; N) y(k; N) \, \text{ik} \quad (2)$$

where
$$d(i, k; N) = (2/N)(1/2)^{1/2} \quad : \text{when } k \text{ is not } 0$$
$$= (2/N)\cos\{\pi(2i+1)k/2N\} \quad : \text{when } k \text{ is } 0$$

$$f(i, k; N) = (1/2)^{1/2} \quad : \text{when } k \text{ is } 0$$
$$= \cos\{\pi(2i+1)k/2N\} \quad : \text{when } k \text{ is not } 0$$

In the formulae, the sum or accumulation for variable i is described as "ii". Further, d(i, k; N) is the DCT coefficient and f (i, k; N) is the inverse DCT coefficient. The formula (1) above represents the DCT operation and (2) the inverse DCT operation.

When the original image data are x (i, j; N) and DCT results are y (k, l; N) for N-order two-dimensional DCT and inverse DCT, the relationship between y (k, l; N) and x (i, j; N) can be expressed by the following formulae (3) and (4). Note that $0 \leq i < N$, $0 \leq j < N$ and $0 \leq l < N$ here.

$$y(k,l;N) = d(j,l;N)x(i,j;N)d(i,k;N) \, \text{ii,j} \quad (3)$$

$$x(i,j;N) = f(i,k;N) y(k,l;N)f(i,j;N) \, \text{ik,l} \quad (4)$$

As seen from the above formulae (3) and (4), N-order two-dimensional DCT and inverse DCT can be executed by performing 2N times the same product-sum operation as N-order one-dimensional DCT and inverse DCT.

In high-efficiency coding whose purpose is a significant reduction in the amount of original image data, the above two-dimensional DCT and two-dimensional inverse DCT are used together with motion vector detection and FIR filter and quantization for data compression. Recommended standardization methods for high-efficiency coding such as MPEG and CCITT-H. 261 specify the image data subjected to the transform to be 8×8 pixels. In other words, it is necessary to execute two-dimensional eight-order DCT and two-dimensional eight-order inverse DCT to realize such a standardization method.

The above DCT transform formulae may be calculated directly. This is referred to as the first conventional operation method. In the first conventional operation method, the operation amount includes $N^2$ times of product-sum operation for one-dimensional N-order DCT and inverse DCT and $2N^3$ times of product-sum operation for two dimensional N-order DCT and inverse DCT. When an operation device adopts the first operation method, even if one cycle is sufficient for one product-sum operation, it takes 1024 cycles to execute two-dimensional eight order DCT and inverse DCT. Thus, in the first conventional operation method, processing cycle increases in the order of $N^3$. For example, to execute two-dimensional eight order DCT and inverse DCT, it takes a long processing time representing substantially half of the high-efficiency coding period.

To solve such problem, high-speed algorithm to reduce the operation amount for DCT and inverse DCT have been developed from the 1970s, and exclusive devices for DCT and inverse DCT operation using such high-speed algorithms have been invented. Such high-speed algorithms utilize symmetry and asymmetry properties of the cosine function to reduce the operation amount for DCT and inverse DCT. Such a DCT and inverse DCT operation methods based on the high-speed algorithms are the second conventional operation method. A DCT and inverse DCT operation device according to a high-speed algorithm FCT method executing such second conventional operation method has been disclosed by Byeong Gi Lee in November 1984 in IEEE Transaction Acoustics, Speech and Signal Processing, Vol. 32, No. 6, pp. 1243 as briefly shown in FIG. 7.

FIG. 7 is a block diagram to show the configuration of eight-order DCT and inverse DCT operation device according to the high-speed algorithm FCT method. The operation device comprises adders 710, 720, 730 and 740 and multipliers 760, 770 and 780 disposed alternately. Execution of operation procedures based on the algorithm of the FCT method with this device enables high-speed DCT and inverse DCT operations.

Thus, a DCT and inverse DCT operation device using the second conventional operation method enables DCT and inverse DCT operations at a higher speed than that with the first conventional operational method. However, it has the following drawbacks:

(1) The operation device using the second conventional operation method requires much hardware.

(2) Its special configuration prevents utilization for high-efficiency coding processes other than DCT and inverse DCT operations.

(3) It lacks flexibility since the number of adders and multipliers required and their configuration vary depending on the order of for DCT and inverse DCT.

Therefore, it is difficult to provide a smaller and less expensive high-efficiency coding device to be used in TV conference systems and video phone systems.

SUMMARY OF THE INVENTION

It is a first object of the present invention to provide an operation device for discrete cosine transform and inverse discrete cosine transform which eliminates conventional drawbacks as described above and, with a general-purpose configuration, enables common use with other high-efficient coding applications such as motion vector detection, FIR filter and quantization, and any arbitrary order of DCT and inverse DCT operations with the same configuration.

It is a second object of the present invention to provide an operation device for discrete cosine transform and inverse discrete cosine transform which can be configured with a small scale of hardware and is capable of high-speed DCT and inverse DCT operations.

It is a third object of the present invention to provide an operation method for discrete cosine transform and inverse discrete cosine transform where two-dimensional N-order DCT and inverse DCT operations can be performed at a high speed by parallel processing of addition/subtraction procedure and product-sum operation procedure in a one-dimensional N-order DCT and inverse DCT.

It is a fourth object of the present invention to provide an operation method of discrete cosine transform and inverse discrete cosine transform having small amount of operations and simple operation procedures including only product-sum operation and addition/subtraction and largely improved operation speed.

According to a preferred embodiment to attain the above objects, a DCT operation method to obtain N pieces of DCT results from N pieces of original image data with arguments from 0 to (N-1) (N is a positive integer expressed by a positive power of 2) comprises an addition step where two data for which the sum of the arguments is M-1 among M pieces of data having arguments from 0 to (M-1) (M is a positive integer expressed by a positive power of 2 from 2 to N) are subjected to addition ($\log_2 N$-1) times and M/2 pieces of addition results with arguments from 1 to (M/2-1) are obtained, a subtraction step where two data for which the sum of the arguments is M-1 among M pieces of data as above are subjected to subtraction ($\log_2 N$-1) times and M/2 pieces of subtraction results with arguments from 1 to (M/2-1), a first product-sum operation step where L pieces of data with arguments from 0 to (L-1) (L is a positive integer expressed by a positive power of 2 from 2 to N/2) and $L^2$ pieces of DCT coefficients are subjected to product-sum operation ($\log_2 N$-1) times and L pieces of DCT results are output and a second product-sum operation step where two data with arguments from 0 to 1 and four DCT coefficients are subjected to product-sum operation once and two DCT results are obtained and an addition/subtraction procedure including the addition step and the subtraction step and a product-sum operation procedure including the first product-sum operation step and the second product-sum operation step perform one-dimensional N-order DCT operation.

According to another preferred embodiment, the first addition step and the first subtraction step use N pieces of the original image data with arguments from 0 to (N-1) as the data, the m-th addition step (m is an arbitrary positive integer from 2 to ($\log_2 N$-1)) and the m-th subtraction step (m is an arbitrary positive integer from 2 to ($\log_2 N$-1) use the addition result obtained at the (m-1)th addition step as the data, the n-th first product-sum operation step (n is an arbitrary positive integer from 1 to ($\log_2 N$-1)) uses as the data the subtraction result obtained at the n-th subtraction step, the second product-sum operation step uses as the data the addition result obtained at the ($\log_2 N$-1)-th addition step, and N pieces of DCT results are obtained by the first product-sum operation step up to the ($\log_2 N$-1)-th time and the second product-sum operation step.

According to a still preferred embodiment, the addition/subtraction procedure and product-sum operation procedure are performed 2N times respectively and two-dimensional N-order DCT operation is executed by processing a certain product-sum operation procedure and the next addition-subtraction procedure in parallel.

According to a further preferred embodiment, an inverse DCT operation method to obtain N pieces of original image data from N pieces of DCT results with arguments from 0 to (N-1) (N is a positive integer expressed by a positive power of 2) comprises a first product-sum operation step where $2^n$ pieces of DCT results with arguments for which the remainder of division by an argument $N/2^n$ is $N/2^{n+1}$ (n is an arbitrary positive integer from 1 to ($\log_2 N$-1)) among the DCT results and $2^{2n}$ pieces of inverse DCT coefficients are subjected to the product-sum operation for ($\log_2 N$-1 0 times and $2^n$ pieces of product-sum operation results with arguments from 0 to (2n-1) are obtained, a second product-sum operation step where two DCT results whose arguments are 0 and N/2 among the DCT results and four inverse DCT coefficients are subjected to the product-sum operation once and two product-sum operation results with arguments from 0 to 1 are obtained, an addition step where two data with the same arguments among two pairs of L pieces of data with arguments from 0 to (L-1) are subjected to addition ($\log_2 N$-1) times and L pieces of addition results are obtained and a subtraction step where two data with the same arguments among two pairs of L pieces of data with arguments from 0 to (L-1) are subjected to subtraction ($\log_2 N$-1) times and L pieces of subtraction results are obtained and a product-sum operation procedure including the first product-sum operation step and the second product-sum operation step and an addition/subtraction procedure including the addition step and subtraction step perform one-dimensional N-order inverse DCT operation.

According to another preferred embodiment, the first addition step and the first subtraction step use, as the two pairs of data, the product-sum operation result from the second product-sum operation step and the product-sum operation result from the initial first product-sum operation step, the m-th addition step (m is an arbitrary positive integer from 2 to ($\log_2 N$-1) and the m-th subtraction step use, as the two pairs of data, the addition result of the (m-1)th addition step and the subtraction result of the (m-1)th subtraction step and the product-sum operation result from the m-th first product-sum operation step and N pieces of original image data are obtained as the addition results of the ($\log_2 N$-1)th addition step and the subtraction results of the ($\log_2 N$-1)th subtraction results.

According to a still preferred embodiment, the product-sum operation procedure and the addition/subtraction procedure are performed 2N times respectively and two-dimensional N-order inverse DCT operation is executed by processing a certain addition/subtraction operation procedure and the next product-sum procedure in parallel.

According to a preferred embodiment of the present invention to attain the above objects, an operation device for discrete cosine transform and inverse discrete cosine transform comprises memory means to store original image data, intermediate operation results, DCT operation results, DCT coefficients and inverse DCT coefficients, address generator means which specifies read/write addressed for data in the memory means, adder means which performs addition or subtraction of the data read out of a plurality of addresses in the memory means as specified by the address generator means and writes the operation results to the address in the memory as specified by the address generator means, and product-sum operation means which performs product-sum operation of the data read out of a plurality of addresses in the memory means as specified by the address generator means and writes the operation results to the address in the memory means as specified by the address generator means.

According to a further preferred embodiment, the adder means reads out two data for which the sum of the arguments is M-1 from M pieces of data with arguments 0 to (M-1) stored in the memory means according to the specification by the address generator means (M is a positive integer expressed by a positive power of 2 from 2 to N) and performs addition/subtraction for the two read data and writes M/2 pieces of addition results and subtraction results with arguments from 1 to (M/2-1) to the memory means and the product-sum operation means performs product-sum operation for L pieces of data with arguments from 0 to (L-1) read out of the memory means according to the specification of the address generator means (L is a positive integer expressed by a positive power of 2 from 2 to N/2) and $L^2$ pieces of DCT coefficients and outputs L pieces of DCT results, and further performs product-sum operation for two data with arguments from 0 to 1 read out of the memory means according to the specification by the address generator means and four DCT coefficients and outputs two DCT results.

According to a still preferred embodiment of an operation device, the product-sum operation means reads out, from the DCT results stored in the memory means, $2^n$ pieces of DCT results with arguments of which the reminder in division by the argument $N/2^n$ (n is an arbitrary positive integer from 1 to $(\log_2 N-1)$) is $N/2^{n+1}$ according to the specification by the address generator means and $2^{2n}$ pieces of inverse DCT coefficients, performs product-sum operation of the read out DCT results and DCT coefficients and outputs $2^n$ pieces of product-sum operation results with arguments from 0 to $(2^n-1)$ and, further reads out two DCT results with arguments 0 and N/2 and four inverse DCT inversion coefficients, performs product-sum operation for the read out DCT results and DCT coefficients and outputs two product-sum operation results with arguments from 0 to 1 and the addition means reads out two data with the same arguments among two pairs of L pieces of data with arguments from 0 to (L-1) stored in the memory means according to the specification from the address generator means, performs addition/subtraction of the read out data and obtains L pieces of addition results and subtraction results.

According to a further preferred embodiment of the present invention, an operation device for discrete cosine transform and inverse discrete cosine transform further comprises first and second memory means and first and second address generator means which specify addresses for the first and second memory means and the first and second memory means are connected with the addition means and product-sum operation means with doubled buses and addition/subtraction by the adder means and product-sum operation by the product-sum operation means are performed in parallel.

Other objects, features and advantages of the present invention will become clear from the detailed description given below.

BRIEF DESCRIPTION OF THE DRAWINGS

The present invention will be understood more fully from the detailed description given below and from the accompanying drawings of the preferred embodiment of the invention, which, however, should not be taken as limitations of the invention, but are for explanation and understanding only.

In the drawings:

FIG. 4 is a block diagram to show a DCT and inverse DCT operation device according to a second embodiment of the present invention.

FIG. 5 is a timing chart to show the timings in the operation of two-dimensional N-order DCT with the device of FIG. 4;

FIG. 6 is an explanatory view to describe the effect of the operation method according to the present invention.

DESCRIPTION OF THE PREFERRED EMBODIMENTS

Figure 1:
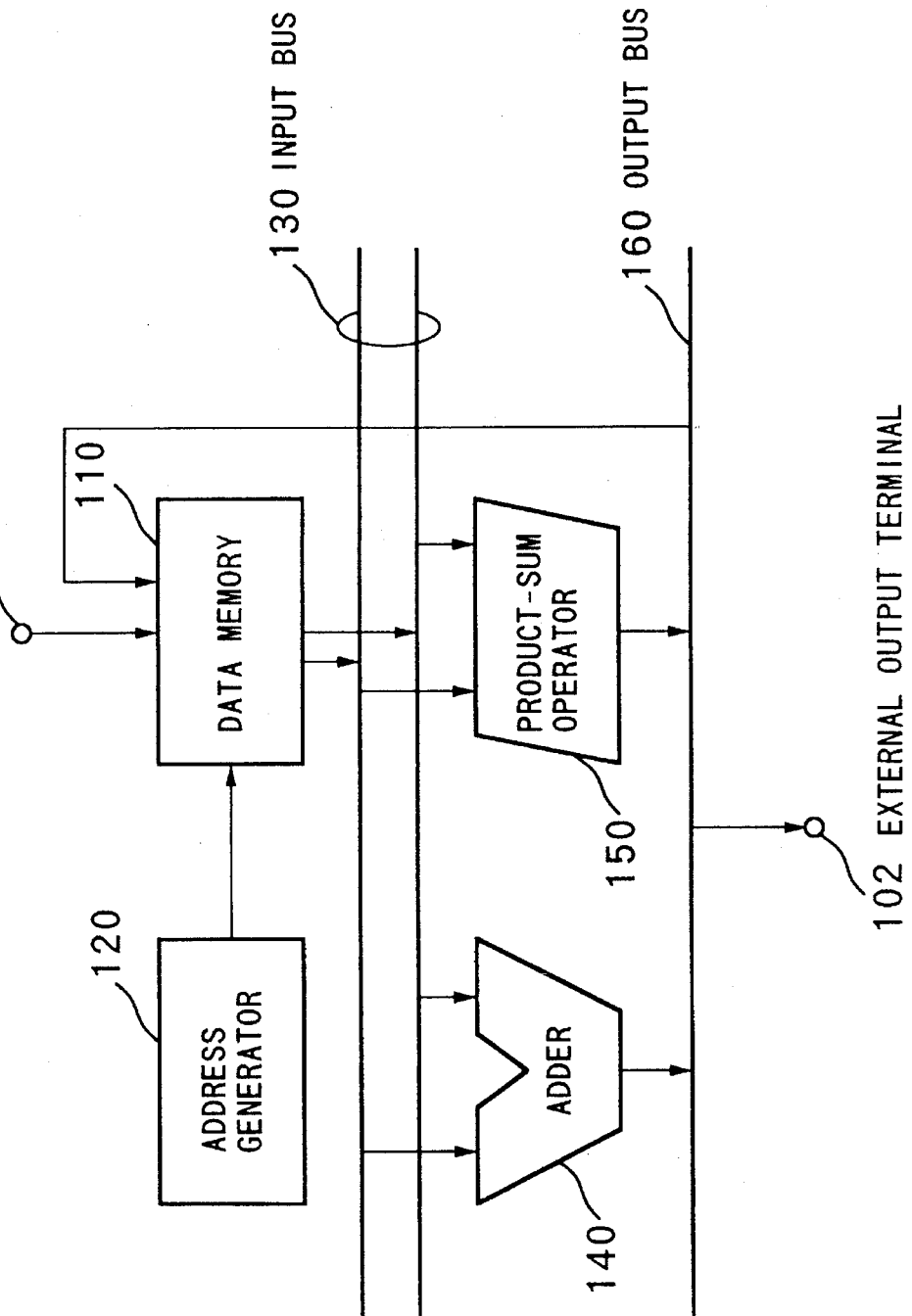
FIG. 1 is a block diagram to show a DCT and inverse DCT operation device according to a first embodiment of the present invention.

Referring to the attached figures, preferred embodiments of the present invention will be described below. FIG. 1 is a block diagram to show a preferred embodiment of a DCT operation device according to the present invention.

A DCT operation device comprises a data memory 110 to store image data, DCT results, intermediate operation data, DCT coefficients and inverse DCT coefficients, an input terminal 101 to provide data from outside to the data memory 11, an address generator 120 which specifies read/write addresses for the data memory 110, an input bus 130 which receives the data read from the data memory 110, an adder 140 which receives two input data from the input bus 130 and performs addition or subtraction, a product-sum operator 150 which receives two input data from the input bus 130 and performs product-sum operation, an output bus 160 which receives the output from the adder 140 or from the product-sum operator 150 and writes to the data memory 110, and an external output terminal 102 which outputs DCT results or the original image data restored by inverse DCT.

Figure 2:
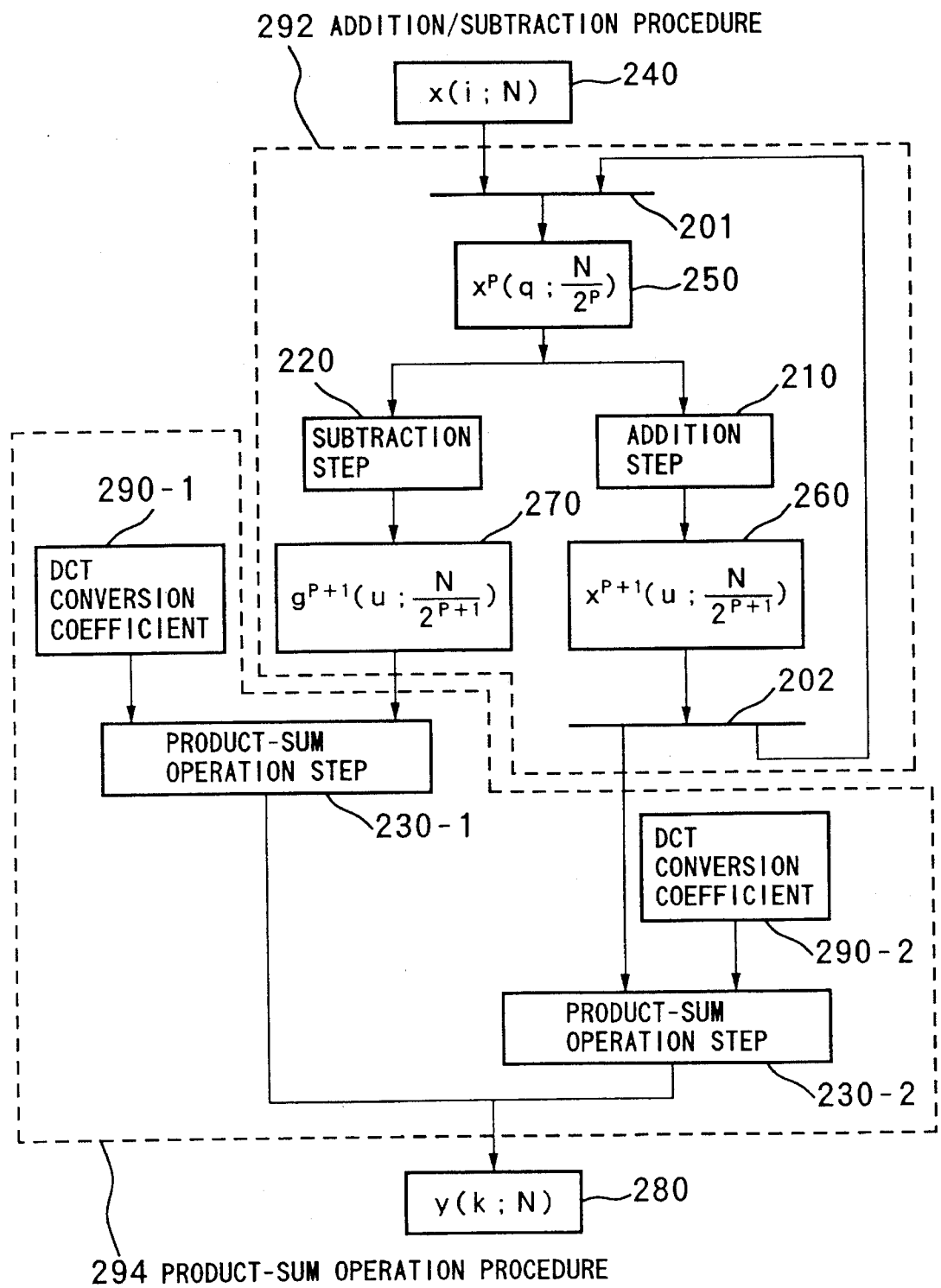
FIG. 2 is a flowchart to show the operation method for one-dimensional N-order DCT with the device of FIG. 1.

FIG. 2 is a flowchart to show the operation contents of one-dimensional N-order DCT (N is a positive integer which can be expressed as a positive power of 2) at the DCT operation device as shown in FIG. 1.

According to the present invention, one-dimensional N-order DCT operation is made by executing an addition step 210, a subtraction step 220, a product-sum operation step 230-1 and another product-sum operation step 230-2 for N pieces of original image data x(i; N) 240 one by one according to the flow shown in FIG. 2. Referring to FIG. 1, the operations of these operation steps are described below.

The addition step 210 makes addition of $N/2^P$ pieces of addition/subtraction input data $x^P$ (q; $N/2^P$) 250 according to the formula (5) below {P is a positive integer from 0 to $(\log_2 N - 2)$} so as to determine $N/2^{(P+1)}$ pieces of addition results $x^{P+1}$ (u; $N/2^{(P+1)}$) 260. Note that q and u are in the range where $0 \leq N/2^P$ and $0 \leq u < N2^{P+1}$.

$$x^{P+1}(u; N/2^{(P+1)}) = x^P(u; N/2^P) + x^P(N/2^P - 1 - u; N/2^P) \quad (5)$$

In the DCT operation device of FIG. 1, the addition step 210 is executed as follows. Addition/subtraction input data $x^P(q; N/2^P)$ 250 are stored in the data memory 110. According to the instruction from the address generator 120, two addition/subtraction input data 250 are read out to the input bus 130 so that the sum of their arguments becomes $N/2^P - 1$ as the two terms on the right side of the formula above, and sent to the adder 140. The adder 140 executes the operation of the formula above, and the obtained addition result $x^{P+1}$ (u; $N/2^{(P+1)}$) 260 is written to the data memory 110.

In the subtraction step 220, subtraction is made for $N/2^P$ pieces {P is a positive integer from 0 to ($\log_2 N - 2$)} of addition/subtraction input data $x^P$ (q; $N/2^P$) 250 according to the next formula (6) and $N/2^{(P+1)}$ pieces of subtraction results $g^{P+1}$ (u; $N/2^{(P+1)}$) 270 are obtained.

$$g^{P+1}(u; N/2^{(P+1)}) = x^P(u; N/2^P) - x^P(N/2^P - 1 - u; N/2^P) \quad (6)$$

In the DCT operation device of FIG. 1, the subtraction step 220 is executed as follows. Addition/subtraction input data $x^P$ (q; $N/2^P$) 250 are stored in the data memory 110. According to the instruction from the address generator 120, two addition/subtraction input data 250 are read out to the input bus 130 so that the sum of their arguments becomes $N/2^P - 1$ as the two terms on the right side of the formula above and sent to the adder 140. The adder 140 execute the operation of the formula (6) and the obtained subtraction result $g^{P+1}$ (u; $N/2^{(P+1)}$) 270 is written to the date memory 110.

In the product-sum operation step 230-1, $N/2^r$ pieces of DCT results 280 are determined from $N/2^r$ pieces of subtraction results $g^r$ (s; $N/2^r$) 270 {r is a positive integer from 1 to ($\log_2 N - 1$)} and ($N/2^r$) pieces of DCT coefficients 290-1 according to the following formula (7). Note that $0 \leq s < N/2^r$ and $0 \leq t < N/2^r$.

$$y(2^r t + 2^{r-1}; N) = g^r(s; N/2^r) \, d(s, 2^r t + 2^{r-1}; N) \, |s \quad (7)$$

In the DCT operation device of FIG. 1, the product-sum operation step 230-1 is executed as follows. The subtraction results $g^r$ (s; $N/2^r$) 270 and the DCT coefficients 290-1 are stored in the data memory 110. According to the instruction from the address generator 120, the subtraction results $g^r$ (s; $N/2^r$) and the DCT coefficients 290-1 are read out to the input bus 130 one by one and sent to the product-sum operator 150. The product-sum operator 150 performs the calculation according to the formula (7) and the DCT results $y(2^r t + 2^{r-1}: N)$ 280 are output to outside from the external output terminal 102.

In the product-sum operation step 230-2, two DCT results 280 are determined from two addition results $x^\alpha$ (w; 2) 260 and four DCT coefficients 290-2 according to the following formula (8). Note that $0 \leq v < 2$ and $0 \leq w < 2$, and $\alpha = \log_2 N - 1$.

$$y(Nv/2; N) = x^\alpha(w; 2) \, d(w, Nv/2; N) \, | \quad (8)$$

In the DCT operation device of FIG. 1, the product-sum operation step 230-2 is executed as follows. The addition results $x^\alpha(w;2)$ 260 and the DCT coefficients 290-2 are stored in the data memory 110. According to the instruction from the address generator 120, the addition results 260 and DCT coefficients 290-2 are read out to the input bus 130 one by one and sent to the product-sum operator 150. The product-sum operator 150 performs the calculation according to the formula (8), and the DCT results y(Nv/2; N) 280 are output to outside from the external output terminal 102.

Still referring to FIG. 1, the entire operation procedures in FIG. 2 are described below. In FIG. 2, the operation method for one-dimensional N-order DCT comprises an addition/subtraction procedure 292 and a product-sum operation procedure 294.

The addition/subtraction procedure 292 uses as the input data the original image data x (i; N) 240 provided from outside via the internal terminal 101 and stored in the data memory 110.

A switch 201 selects the original image data x (i; N) 240 as the addition/subtraction input data 250 for the first addition step 210 and the first subtraction step 220. It selects the addition result 260 of the previous addition step 210 as the addition/subtraction input data 250 for the second to the ($\log_2 N - 1$)-th addition steps 210 and the second to the ($\log_2 N - 1$)-th subtraction steps 220.

In the description of addition steps 210 and the subtraction steps 220, the case with the input data of $x^P(q;N/2^P)$ 250 where P=0 corresponds to the original image data x (i; N) 240.

A switch 202 does not send the addition result 260 of the ($\log_2 N - 1$)-th addition step 210 to the addition step 210 and the subtraction step 220 again but send it to the product-sum operation step 230-2.

Thus executing the addition steps 210 and subtraction steps 220 recursively, $N/2^{(P+1)}$ pieces of addition results $x^{P+1}$(u; $N/2^{(P+1)}$) 260 and subtraction P+i (P+I) results $g^{P+1}$ (u; $N/2^{(P+1)}$) 270 are obtained.

Next, the product-sum operation procedure 294 is executed using the operation results of the addition/subtraction procedure 292. By using the subtraction results $g^{P+1}$(u; $N/2^{P+1}$) 270 from $g^1$ to $g^\alpha$ as the input data and performing the product-sum operation step 230-1 for ($\log_2 N - 1$) times, $N/2^{(P+1)}$ pieces of DCT results are determined. Similarly, by using the addition results $x^\alpha$ (w; 2) 260 as the input data and performing the product-sum operation step 230-2, two DCT results are determined. From the above procedure, N pieces of one-dimensional N-order DCT operation results are obtained in total.

Figure 3:
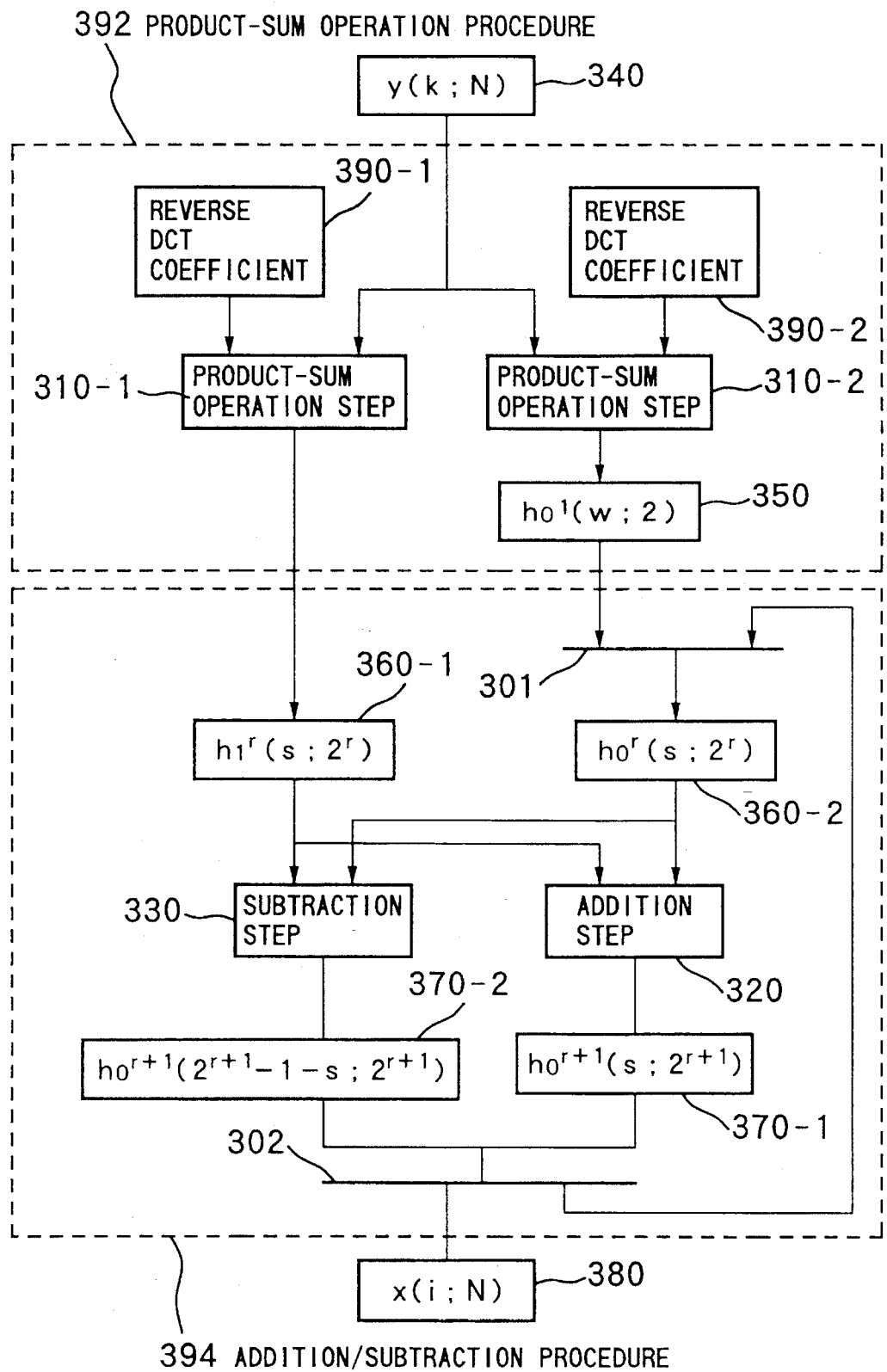
FIG. 3 is a flowchart to show the operation method for one-dimensional N-order inverse DCT with the device of FIG. 1.
Figure 7:
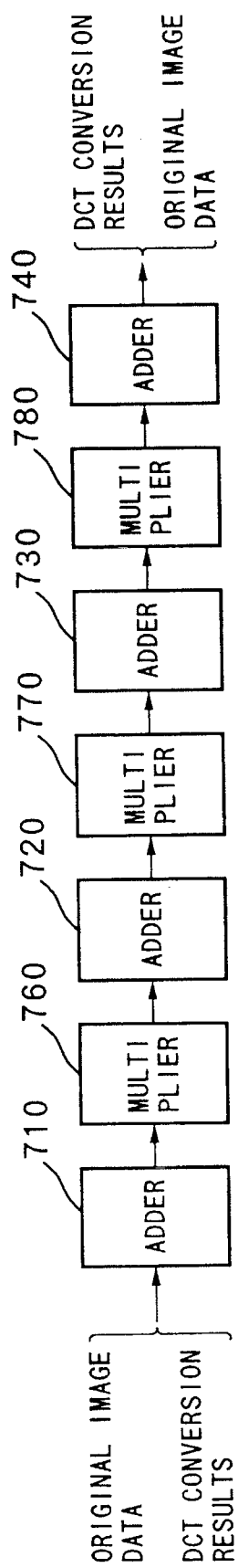
FIG. 7 is a block diagram to show the configuration of a DCT and inverse DCT operation device according to the conventional high-speed algorithm FCT method.

FIG. 3 is a flowchart to show the operation of one-dimensional N-order inverse DCT by the DCT operation device of FIG. 1. The inverse DCT operation as shown in FIG. 3 is made by executing a product-sum operation step 310-1, another product-sum operation step 310-2, an addition step 320 and a subtraction step 330 for N pieces of DCT results y (k; N) 340 one by one. The operations of the individual operation steps are described below.

In the product-sum operation step 310-1, $2^r$ pieces of addition/subtraction input data $h1^r$ (s; $2^r$) 360-1 are determined from $2^r$ pieces of DCT results $y(Nt/2^r + N/2^{r+1}; N)$ 340 and $2^{24}$ inverse DCT coefficients 390-1 according to the following formula (9) {r is a positive integer from 1 to ($\log_2 N - 1$)}. Note that, however, $0 \leq s < 2^r$ and $0 \leq t < 2^r$.

$$h1^r(s; 2^r) = f(s, Nt/2^r + N/2^{r+1}; N) y(Nt/2^r + N/2^{r+1}; N) \, |t \quad (9)$$

In the DCT operation device of FIG. 1, the product-sum operation step 310-1 is executed as follows. DCT results $y(Nt/2^r + N/2^{r+1}; N)$ 340 and inverse DCT coefficients 390-1 are stored in the data memory 110. According to the instruction from the address generator 120, DCT results $y(Nt/2^r + N/2^{r+1}; N)$ 340 and inverse DCT coefficients 390-1 are read out to the input bus 130 one by one and sent to the product-sum operator 150. The product-sum operator 150 performs the calculation of the formula (9) and the addition/subtraction input data $h1^r$ (s; $2^r$) 360-1 are written to the data memory 110.

In the product-sum operation step 310-2, two pieces of product-sum operation results $h0^1$ (w; 2) 350 are determined from two pieces of DCT results y (Nv/2; N) 340 and four inverse DCT coefficients 390-2 according to the following formula (10). Note that $0 \leq v < 2$ and $0 \leq w < 2$.

$$h0^1 \ (w; \ 2) = f(w, Nv/2; \ N) y(Nv/2; N) \ |v \quad (10)$$

In the DCT operation device of FIG. 1, the product-sum operation step 310-2 is executed as follows. DCT results y (Nv/2; N) 340 and inverse DCT coefficients 390-2 are stored in the data memory 110. According to the instruction from the address generator 120, DCT results y (Nv/2; N) 340 and inverse DCT coefficients 390-2 are read out to the input bus 130 one by one and sent to the product-sum operator 150. The product-sum operator 150 performs the calculation of the formula (10) and the product-sum operation results $h0^1$ (w; 2) 350 are written to the data memory 110.

In the addition step 320, 2r pieces of addition input data $h1^r(s; \ 2^r)$ 360-1 and $2^r$ pieces of addition/subtraction input data $h0^r$ (s; $2^r$) 360-2 are subjected to addition and 2r pieces of addition results $h0^{r+1}$ (s; $2^{r+1}$) 370-1 are determined.

$$r+1(s; \ 2^{r+1}) = h0^r \ (S; \ 2^r) + h1^r(s; \ 2^r) \quad (11)$$

In the DCT operation device of FIG. 1, the addition step 320 is executed as follows: Addition/subtraction input data $h1^r$ (s; $2^r$) 360-1 and $2^r$ pieces of addition/subtraction input data $h0^r$ (s; $2^r$) 360-2 are stored in the data memory 110. According to the instruction from the address generator 120, two addition/subtraction input data having the same arguments as the two terms on the right side of the above formula are read out to the input bus 130 and sent to the adder 140. The adder 140 performs the operation of the above formula and the obtained addition results $h \ 0^{r+1}$ (s; $2^{r+1}$) 370-1 are written to the data memory 110.

In the subtraction step 330, 2r pieces of addition/subtraction input data $h1^r$ (s;2r) 360-1 and 2r pieces of addition/subtraction input data $h0^r$ (s; 2r) 360-2 are added so as to determine 2r pieces of subtraction results $h0^{r+1}$ ($2^{r+1} - 1 - s$; $2^{r+}$) 370-2.

$$h0^{r+}(2^{r+1}-1-s; \ 2^{r+1}) = h0^r \ (s; \ 2^r) - h1^r \ (s; \ 2^r) \quad (12)$$

In the DCT operation device of FIG. 1, the subtraction step 330 is executed as follows. The addition/subtraction input data $h1^r$ (s; $2^r$) 360-1 and $2^r$ pieces of addition/subtraction input data $h0^r$ (s, $2^r$) 360-2 are stored in the data memory 110. According to the instruction from the address generator 120, two addition/subtraction input data having the same arguments as the two terms on the right side of the above formula are read out to the input bus 130 and sent to the adder 140. The adder 140 performs the operation of the above formula and the obtained subtraction results $h0^{r+1}$ ($2^{r+1}-1-s$; $2^{r+1}$) 370-2 are written to the data memory 110.

Next, still referring to FIG. 1, the entire operation procedures in FIG. 3 are described below. In FIG. 3, the operation method for one-dimensional N-order inverse DCT comprises a product-sum operation procedure 392 and an addition-subtraction procedure 394.

The product-sum operation procedure 392 uses as the input data the DCT results y (k, N) 340 provided from outside via the input terminal 101. According to the above description, the product-sum operation step 310-1 is executed for r times {r is from 1 to ($\log_2 N$ - 1) for the applicable DCT results y (Nt/$2^r$ + N/$2^{r+1}$; N) 340 and the addition/subtraction input data $h1^r$ (s; $2^r$) 360-1 are written to the data memory 110. Similarly, the product-sum operation step 310-2 is executed for the DCT results y (Nv/2; N) 340 and the product-sum operation results $h0^1$ (w; 2) 350 are written to the data memory 110.

Next, the addition/subtraction procedure 394 is executed with using the operation result of the product-sum operation procedure 392. A switch 301 selects as the addition/subtraction input data $h0^r$ (s; $2^r$) 360-2, the product-sum operation result 350 of the product-sum operation step 310-2 when r=1. When r is not 1, it selects the addition results 370-1 and the subtraction results 370-2 of the addition step 320 and the subtraction step 330.

The r-th addition step 320 and the subtraction step 330 {r=1 to ($\log_2 N$ - 1)) use the addition/subtraction input data $h1^r$ (s; $2^r$) 360-1 as one input and the addition/subtraction input data $h0^r$ (s; $2^r$) 360-2 as the other input for their operations and write the addition results $h0^{r+1}$ (s; $2^{r+1}$) 370-1 and the subtraction results $h0^{r+1}$ ($2^{r+1}-1-s$; $2^{r+1}$) 370-2 to the data memory 110.

A switch 302 outputs the addition result 370-1 and the subtraction result 370-2 of the ($\log_2 N$- 1)-th time alone to outside as the original image data 380 as the result of inverse DCT via the output terminal 102. Thus, N pieces of operation results from one-dimensional N-order inverse DCT are obtained in total.

FIG. 4 is a block diagram to show a second embodiment of a DCT and inverse DCT operation device according to the present invention. In FIG. 4, a DCT and inverse DCT operation device comprises data memories 410-1 and 410-2 to store original image data, DCT results, intermediate operation results, DCT coefficients and inverse DCT coefficients, an input terminal 401 which provides data from outside to the data memories 410-1 and 410-2, an address generator 420-1 which specifies the data read/write addresses for the data memory 410-1, an address generator 420-2 which specifies the data read/write addresses for the data memory 410-2, an adder input bus 430-1 and a product-sum operator input bus 430-2 which receive data read out of the data memories 410-1 and 410-2, an adder 440 which receives two data from the adder input bus 430-1 and performs addition or subtraction, a product-sum operator 450 which receives two data from the product-sum operator input bus 430-2 and performs product-sum operation, output buses 460-1 and 460-2 which receive the output from the adder 440 or the product-sum operator 450 and write data to the data memories 410-1 and 410-2 and an external output terminal 402 which outputs the original image data to outside as the result of DCT or inverse DCT. In this device, all components including data memory, address generator and input and output buses are doubled so that the adder 440 and the product-sum operator 450 can perform operations in parallel.

Two-dimensional N-order DCT operation using the DCT and inverse DCT operation device according to this embodiment will be described below.

Two-dimensional N-order DCT operation can be executed by performing the one-dimensional N order DCT operation for 2N times. Therefore, one-dimensional N-order DCT operation is described first.

In the embodiment of FIG. 4, too, one-dimensional N-order DCT comprises an addition/subtraction procedure 292 and a product-sum operation procedure 294 as in the operation method as shown in FIG. 2. The description below is given referring to FIGS. 2 and 4.

The original image data 240 sent from the external input terminal 401 are stored in the data memory 410-1. For the original image data 240, the addition step 220 in the addition/subtraction procedure 292 is executed as described above. Note that, however, the data memory 110 is replaced by the data memory 410-1, the address generator 120 is replaced by the address generator 420-1, the input bus 130 by the adder input bus 430-1, and the adder 140 by the adder 440. All subtraction results 260 and the final addition results 250 are stored in the data memory 410-2.

For the subtraction results 260 and the addition results 250 stored in the data memory 410-2, the product-sum operation steps 230-1 and 230-2 of the product-sum operation procedure 294 are executed as described above. Note that, however, the data memory 110 is replaced by the data memory 410-2, the address generator 120 is replaced by the address generator 420-2, the input bus 130 by the product-sum operator input bus 430-2 and the product-sum operator 150 by the product-sum operator 450. Further, DCT results from the first one-dimensional N-order DCT operation for the first N times are not output to outside from the external output terminal 402 but stored in the data memory 410-1 again.

FIG. 5 is a diagram to show the timings in the two-dimensional N-order DCT operation method at the device of FIG. 4. In FIG. 5, two-dimensional N-order DCT can be executed by performing one-dimensional N-order DCT operation 510 for 2N times. One-dimensional N-order DCT is, as explained in the description for FIG. 2, executed by addition/subtraction procedure 292 and the product-sum operation procedure 294. In the case of the device in FIG. 4, the adder 440 and the product-sum operator 450 can operate in parallel and as shown in FIG. 5, a certain one-dimensional N-order DCT product-sum operation procedure 294 and the next repeated one-dimensional N-order DCT addition/subtraction procedure 292 can be executed in parallel. Thus, in the two-dimensional N-order DCT operation method of the present invention, one dimensional N-order DCT product-sum operation procedure 294 and the addition/subtraction procedure 292 are overlapped by performing parallel processing at the adder 440 and the product-sum operator 450.

Next, two-dimensional N-order inverse DCT operation by the DCT and inverse DCT operation device of FIG. 4 is described below.

Two-dimensional N-order inverse DCT can be executed by performing one-dimensional N-order inverse DCT for 2N times. One-dimensional N-order inverse DCT can be realized by the product-sum operation procedure 392 and the addition/subtraction procedure 394 as described in the explanation for FIG. 3. In this case, as in the case of two-dimensional N-order DCT operation, a certain one-dimensional N-order inverse DCT addition/subtraction procedure 394 and the next repeated one-dimension N-order inverse DCT product-sum operation procedure 392 can be executed in parallel. Thus, in the two-dimensional N-order inverse DCT operation method of the present invention, one dimensional N-order DCT addition/subtraction procedure 394 and the product-sum operation procedure 392 are overlapped by parallel processing at the adder 440 and the product-sum operator 450.

FIG. 6 is a diagram to show the effect of the operation method for one-dimensional N-order DCT and one-dimensional N-order inverse DCT with the DCT and inverse DCT operation device according to the present invention. In FIG. 6, the operation procedure and the operation amount for one-dimensional eight-order DCT and one-dimensional eight-order inverse DCT as well as the operation amount for one-dimensional N-order DCT and one-dimensional N-order inverse DCT according to the present invention are compared with those by the two conventional methods.

Referring to FIG. 6, for the operation method of the present invention and the second conventional operation method, one-dimensional eight-order DCT operation follows the steps from the top to the bottom and one-dimensional eight-order inverse DCT operation follows them from the bottom to the top. The operation amount is indicated by the number of executions of unit operations, which include product-sum operation, addition/subtraction and multiplication.

From the comparison in FIG. 6, it is concluded as follows:

(1) For the operation amount, the first conventional method recorded 64, the second conventional method 42, the operation method of the present invention recorded 36. The operation method of the present invention involves the least operation amount.

(2) Though the second conventional method has repeated addition/subtraction procedure and multiplication procedure in the operation procedure, the present invention method simply executes a product-sum operation procedure and an addition/subtraction procedure, which is much easier.

(3) Though the second conventional method makes multiplication for three times for one data, the operation method of the present invention makes a product-sum operation only once for one data, which minimizes the effect of rounding error during multiplication execution.

Thus, the DCT and inverse DCT operation method of the present invention has superior properties to the first and second conventional methods in one-dimensional eight-order DCT and one-dimensional eight-order inverse DCT. For general one-dimensional N-order DCT and inverse DCT, as seen from FIG. 6, the second conventional method has less operation amount than the operation method of the present invention when N is 16 or more. In this case, the conclusion (1) above is not true. On the other hand, conclusions (2) and (3) become more significant as N increases.

Further, the DCT and inverse DCT operation device of the present invention has an advantage in that it enables parallel operations of the adder and the product-sum operator. Therefore, addition/subtraction procedure and product-sum operation procedure of one-dimensional N-order DCT or one-dimensional N-order inverse DCT can be processed in parallel for two-dimensional N-order DCT and two-dimensional N-order inverse DCT. This can realize much higher speed DCT and inverse DCT operations.

As described above, the DCT and inverse DCT operation device of the present invention has a flexible configuration with data memories, an address generator, an adder and a product-sum operator connected with buses and it can be also used for processing other than high-efficiency coding. In addition, the same operator configuration can be used for any arbitrary order DCT and inverse DCT operations. With a small scale hardware, DCT and inverse DCT operation device for a higher speed can be configured.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A method for high efficiency coding of image data implemented in an operation device for discrete cosine transform to obtain N pieces of discrete data in frequency space from N pieces of original image data with arguments from 0 to (N-1) (N is a positive integer expressed by a positive power of 2), said method comprising the steps of:

(a) receiving and storing said N pieces of the original image data in a data memory;

(b) adding two pieces of data among M pieces of data having arguments from 0 to (M-1) (M is a positive integer expressed by a positive power of 2 from 2 to N) whose respective arguments have a sum of M-1 ($\log_2 N$ -1) times and storing M/2 pieces of addition results with arguments from R to (M/2 - 1) in said data memory;

(c) subtracting said two pieces of data ($\log_2 N$ - 1) times and storing M/2 pieces of subtraction results with arguments from R to (M/2 - 1) in said data memory;

(d) executing a first product-sum operation with L pieces of data with arguments from 0 to (L-1) (L is a positive integer expressed by a positive power of 2 from 2 to N/2) and $L^2$ pieces of discrete cosine transform coefficients ($\log_2 N1$) times to obtain L pieces of discrete cosine transform results and storing said L pieces of discrete cosine transform results in said data memory; and (e) executing a second product-sum operation with two pieces of data with arguments from 0 to 1 and four discrete cosine transform coefficients to obtain two of discrete cosine transform results and storing said two pieces of discrete cosine transform results in said data memory.

2. The method as set forth in claim 1, wherein a first iteration of said adding and subtracting use N pieces of said original image data with arguments from 0 to (N-1), an m-th iteration of said adding and subtracting {m is an arbitrary positive integer from 2 to ($\log_2 N$-1)} use the addition result obtained at an (m-1)th iteration of said adding, an n-th iteration of said executing of first product-sum operation (n is an arbitrary positive integer from 1 to ($\log_2 N$-1)) uses the subtraction result obtained at an n-th iteration of said subtracting, said executing of the second product-sum operation step uses the addition result obtained at a ($\log_2 N$-1)-th iteration of said adding, and said N pieces of direct cosine transform results are obtained by said executing of the first product-sum operation up to a ($\log_2 N$-1)-th iteration and said executing of the second product-sum operation.

3. The method as set forth in claim 2, wherein an addition/subtraction procedure which includes the steps of said adding and said subtracting and a product-sum operation procedure which includes said first and second product-sum operations are performed for 2N times respectively, and a two-dimensional N-order discrete cosine transform operation is executed by processing an iteration of said product-sum operation procedure in parallel with a next iteration of said addition-subtraction procedure.

4. A method for high efficiency coding of image data implemented in an operation device for inverse discrete cosine transform to obtain N pieces of original image data from N pieces of discrete data in frequency space with arguments from 0 to (N-1) (N is a positive integer expressed by a positive power of 2), said method comprising the steps of:

(a) receiving and storing said N pieces of discrete data in frequency space in a data memory;

(b) executing a first product-sum operation with $2^n$ pieces of discrete data among said N pieces whose arguments have a remainder of $N/2^{n+1}$ after division by an argument $N/2^n$ (n is an arbitrary positive integer from 1 to ($\log_2 N$-1)) and $2^n$ pieces of inverse discrete cosine transform coefficients ($\log_2 N$-1) times to obtain $2^n$ pieces of first product-sum operation results with arguments from 0 to ($2^n$-1) and storing said first product-sum operation results in said data memory;

(c) executing a second product-sum operation with two pieces of discrete data among said N pieces whose arguments are 0 and N/2 and four inverse discrete cosine transform coefficients to obtain two pieces of second product-sum operation results with arguments from 0 to 1 and storing said second product-sum operation results in said data memory;

(d) adding two data with the same arguments among two pairs of L pieces of data with arguments from 0 to (L-1) ($\log_2 N$-1) times and storing L pieces of addition results in said data memory; and (e) subtracting two data with the same arguments among two pairs of L pieces of data with arguments from 0 to (L-1) ($\log_2 N$-1) times and storing L pieces of subtraction results in said data memory.

5. The method as set forth in claim 4, wherein said two pairs of L pieces of data used by said adding and said subtracting are the product-sum operation result from said executing of the second product-sum operation and the product-sum operation result from a first iteration of said executing of the first product-sum operation, said two pairs of L pieces of data used by an m-th iteration of said adding {m is an arbitrary positive integer from 2 to ($\log_2 N$-1)} and an m-th iteration of said subtracting are derived from the addition result of an (m-1)th iteration of said adding and the subtraction result of an (m-1)th iteration of said subtracting and the product-sum operation result from an m-th iteration of said executing of the first product sum operation, and said N pieces of original image data are obtained from the addition result results of a ($\log_2 N$-1)th iteration of said adding and the subtraction result of a ($\log_2 N$-1)th iteration of said subtracting.

6. The method as set forth in claim 5, wherein a product-sum operation procedure which includes said first and second product-sum operations and an addition/subtraction procedure which includes the steps. of said adding and said subtracting are performed for 2N times respectively, and a two-dimensional N-order discrete cosine transform operation is executed by processing an iteration of said addition/subtraction procedure in parallel with a next iteration of said product-sum operation procedure.

7. An operation device for discrete cosine transform and inverse discrete cosine transform comprising:

memory means for storing original image data, intermediate operation results, discrete cosine transform operation results, discrete cosine transform coefficients and inverse discrete cosine transform coefficients;

address generator means for specifying read/write addresses for data in said memory means;

adder means for performing addition or subtraction of the data read out of a plurality of addresses in said memory means as specified by said address generator means and writing the addition or subtraction operation results to the address in said memory means as specified by said address generator means; and product-sum operation means for performing product-sum operation of the data read out of a plurality of addresses in said memory means as specified by said address generator means and writing the product-sum operation results to the address in said memory means as specified by said address generator means.

8. An operation device for discrete cosine transform and inverse discrete cosine transform as set forth in claim 7, wherein said adder means reads out two data whose arguments have a sum of M-1 from M pieces of data with arguments 0 to (M-1) stored in said memory means according to the address specified by said address generator means (M is a positive integer expressed by a positive power of 2 from 2 to N) and performs addition and subtraction for the two data and writes M/2 pieces of addition results and subtraction results with arguments from 0 to (M/2-1) to said memory means, said product-sum operation means performs product-sum operation for L pieces of data with arguments from 0 to (L-1) read out of said memory means according to the address specified by said address generator means (L is a positive integer expressed by a positive power of 2 from 2 to N/2) and $L^2$ pieces of discrete cosine transform coefficients to output L pieces of discrete cosine transform results, and said product-sum operation means further performs product-sum operation for the two data with arguments from 0 to 1 read out of said memory means according to the address specified by said address generator means and four discrete cosine transform coefficients to output two pieces of direct cosine transform results.

9. An operation device for discrete cosine transform and inverse discrete cosine transform as set forth in claim 7, wherein said product-sum operation means reads out, from said discrete cosine transform results stored in said memory means, $2^n$ pieces of discrete cosine transform results with arguments of which the remainder in division by the argument $N/^n$ {n is an arbitrary positive integer from 1 to $(\log_2 N-1)$} is $N/2^{n+1}$ according to the address specified by said address generator means and $2^{2n}$ pieces of inverse discrete cosine transform coefficients, performs product-sum operation of the read out discrete cosine transform results and discrete cosine transform coefficients and outputs $2^n$ pieces of product-sum operation results with arguments from 0 to $(2^n-1)$ and, further reads out two discrete cosine transform results with arguments 0 and N/2 and four inverse discrete cosine transform coefficients, performs product-sum operation for the read out discrete cosine transform results and discrete cosine transform coefficients and outputs two product-sum operation results with arguments from 0 to 1, and said addition means reads out two data with the same arguments among two pairs of L pieces of data with arguments from 0 to (L-i) stored in said memory means according to the address specified by said address generator means, performs addition/subtraction of the read out data and obtains L pieces of addition results and subtraction results.

10. An operation device for discrete cosine transform and inverse discrete cosine transform as set forth in claim 7, further comprising first and second memory means, and first and second address generator means for specifying addresses for said first and second memory means, and said first and second memory means being connected with said addition means and product-sum operation means by a double bus, and addition/subtraction by said adder means and product-sum operation by said product-sum operation means being performed in parallel.

\* \* \* \* \*